(12) United States Patent
Kao et al.

(10) Patent No.: US 6,500,290 B1
(45) Date of Patent: *Dec. 31, 2002

(54) PROCESS FOR MANUFACTURING A MULTI-LAYERED FLAT ADHESIVE TAPE

(75) Inventors: Cheng-Kang Kao, Taipei (TW); David Lin, Taipei Hsien (TW); Sung-Nien Chang, Yilan Hsien (TW)

(73) Assignee: Four Pillars Enterprise Corp., Taipei Hsien (TW)

( * ) Notice: Subject to any disclaimer, the term of this patent is extended or adjusted under 35 U.S.C. 154(b) by 154 days.

This patent is subject to a terminal disclaimer.

(21) Appl. No.: 09/667,079

(22) Filed: Sep. 21, 2000

Related U.S. Application Data

(63) Continuation-in-part of application No. 09/276,782, filed on Mar. 25, 1999, now Pat. No. 6,224,705.

(51) Int. Cl.$^7$ ................................................. B32B 31/00
(52) U.S. Cl. ...................... 156/196; 156/184; 156/185; 156/252; 156/289; 206/411
(58) Field of Search .................................. 156/184, 185, 156/252, 289, 411, 412, 196; 206/411

(56) References Cited

U.S. PATENT DOCUMENTS

| | | | | |
|---|---|---|---|---|
| 3,006,464 A | * | 10/1961 | Snell | 206/411 |
| 4,729,518 A | * | 3/1988 | Mathna et al. | 156/527 |
| 5,269,421 A | * | 12/1993 | Taylor | 206/411 |
| 5,763,038 A | * | 6/1998 | Wood | 15/104.002 |
| 6,224,705 B1 | * | 5/2001 | Kao et al. | 156/230 |

FOREIGN PATENT DOCUMENTS

| | | | |
|---|---|---|---|
| GB | 2214450 A | * | 9/1989 |
| JP | 57-180570 A | * | 11/1982 |
| JP | 9-58743 A | * | 3/1997 |

\* cited by examiner

*Primary Examiner*—Jeff H. Aftergut
(74) *Attorney, Agent, or Firm*—J.C. Patents

(57) ABSTRACT

A process for manufacturing easily portable and multi-layered adhesive tape roll is described. The flat piece of easily portable and multi-layered adhesive tape is formed by compressing the adhesive tape roll having circular shape or other shapes. The adhesive tape roll is compressed and cohered during the compressing step. A stiff interfacial layer, for example, having adhesion by adhering two innermost adhesive surfaces, by providing a stronger adhesion material, by inserting a stiff and solid material, or a stiff and solid material coated with a strong adhesion material, is applied to the symmetry plane of the adhesive tape during the compressing step. The preferential material of the high adhesion material is a cyanoacrylate adhesive or an epoxy adhesive.

18 Claims, 6 Drawing Sheets

PROCESS FOR MANUFACTURING A MULTI-LAYERED FLAT ADHESIVE TAPE

This application is a continuation-in-part of Ser. No. 09/276,782 filed Mar. 25, 1999, now U.S. Pat. No. 6,224,705.

BACKGROUND OF THE INVENTION

1. Field of the Invention

The invention relates in general to special process for manufacturing a multi-layered adhesive tape roll, wherein the flat piece of multi-layered adhesive tape is easily portable adhesive tape capable of saving space for convenient carrying.

2. Description of the Related Art

Conventional adhesive tapes usually are designed with circular inner core, such as paper core, plastic core or similar core. Recent developments have led to the flat adhesive tapes 12. Hollow orthogonal flat plastic tubes are made by ejection molding or hollow square flat paper tubes are designed by bending card board, as reference number 10 shows in FIG. 1. Adhesive tape is then unwounded out from jumbo roll and slitted into a desired tape. The tubes 10 are individually winded up into the flat adhesive tapes 12. However, such a manufacturing method requires a long working time and higher cost. Moreover, this kind of flat adhesive tape cannot provide necessary special physical properties, for example, super-transparence and coherence, due to the occurrence of trapped bubbles when the adhesive tapes are individually winded up.

If the conventional adhesive tapes are compressed directly to become the flat adhesive tape, the inner tubes are distorted and the outside surface of the adhesive tapes is deformed by applied stress. Moreover, a strong rebound force remains in the distorted material, for example, the tube and tape. The more distortion occurs in a short time, the more rebound force there is. Besides, due to intrinsic properties such as visco-elasticity and memory of the substrate and adhesive layer of the adhesive tape structure, after the compression stress is removed the relaxation of the structure accompanied by a rebound force drive the adhesive tape to a stable state. The rebound force drives the adhesive tape to regain the tape's original shape. The strength of the rebound force depends on the deformation degree on the each position of the adhesive tape. The strength of the rebound force further depends on the thickness of the substrate, mechanical strength of the substrate, physical properties of the adhesive layer, adhesion, total length, central length of the symmetric plane (internal diameter before performing the compression step), and the winding up tension of the adhesive tape.

SUMMARY OF THE INVENTION

The manufacturing process of the easily portable and multi-layered adhesive tape of the present invention is suitable for flatting any adhesive tape roll and capable of automatic production and manufacturing a high quality flat adhesive tape.

The flat piece of easily portable and multi-layered adhesive tape, that is a flat adhesive tape, of the present invention is mainly made by flatting the non-flat and multi-layered adhesive tape roll having a circular shape or other shapes. During the flatting process, the non-flat and multi-layered adhesive tape roll is compressed and cohered symmetrically, or a stiff interfacial layer having or lacking high adhesion property is provided before the non-flat and multi-layered adhesive tape is compressed. The existence of the stiff interfacial layer produces an extending force along the symmetric plane of the easily portable flat adhesive tape. This extending force partially diminishes the rebound force, which causes the deformation of the flat adhesive tape. If the total length of the flat adhesive tape is not very long, the rebound force is not very large, either. Therefore, the non-flat adhesive tape without a paper core can be compressed and cohered directly through both innermost adhesive surfaces or a stiff and solid interfacial layer located in the innermost portion of the flat adhesive tape, so that a beautiful and easily portable flat piece of adhesive tape is formed. The stiff and solid interfacial layer is, for example, adhesive, cardboard, plastic plate, metal slice, or combination, or the like. When the strength of the flat adhesive tape is increased using, for example, increasing the thickness of the substrate with a high mechanical strength, increasing the total tape length, or reducing the inner diameter, the rebound force is also increased. Under such circumstances, a layer of high adhesion material can be applied to the symmetric plane of the adhesive tape. The layer of high adhesion material is, for example, high glass transition temperature polymeric materials, thermoset materials, hot melt materials, or ultra-violet curable adhesive materials for ensuring the symmetric cohesion of the innermost portion of the flat adhesive tape. The preferential material of the high adhesion material is a cyanoacrylate adhesive or an epoxy adhesive, having a high cross-linking density property after curing. After solidification for any mentioned adhesion material the high adhesion material not only provides adhesion functionality but also provides an extension force for sustaining the flat adhesive tape and partially offsetting the rebound force. Of course, if the high adhesion material is combined with the stiff interfacial layer, the rebound force is further offset, and the stability of the flat adhesive tape is therefore increased.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DESCRIPTION OF THE PREFERRED EMBODIMENT

First Preferred Embodiment

Figure 1:
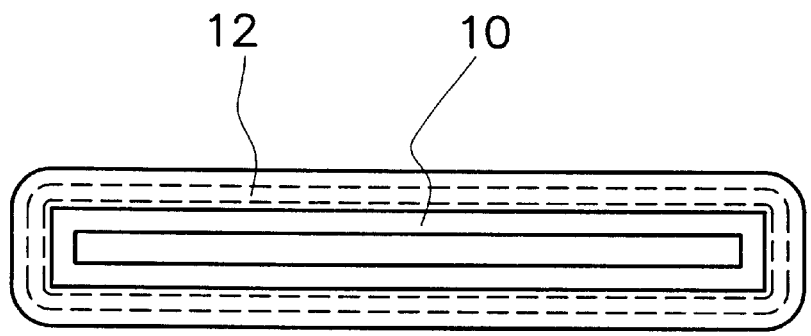
FIG. 1 is a schematic, cross-sectional view showing a conventional adhesive tape roll with a paper core and a plastic core having a hollow orthogonal shape.
Figure 2A:
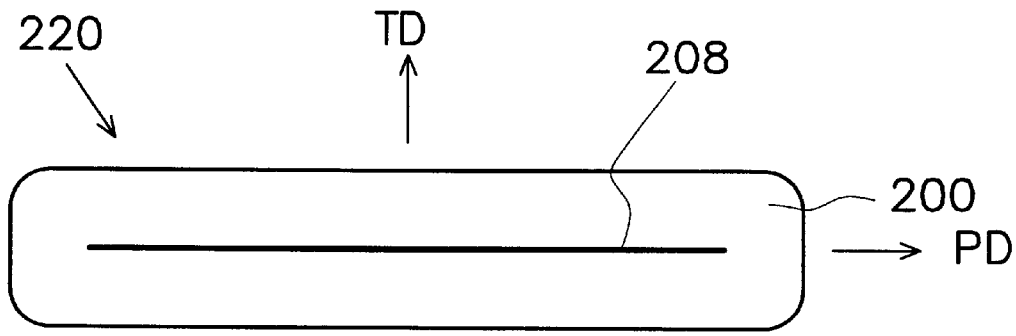
FIG. 2A is a schematic, cross-sectional view showing an flat adhesive tape that has no paper core or plastic core according to a first preferred embodiment of the present invention.
Figure 2B:
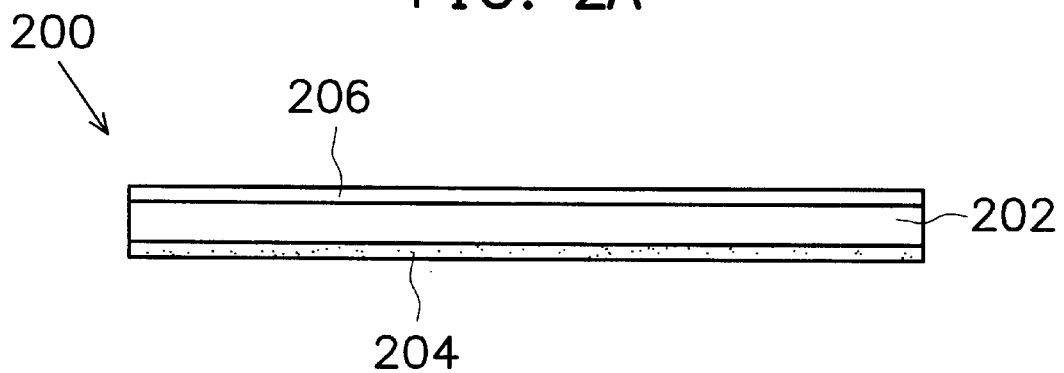
FIG. 2B is a diagram showing a schematic, cross-sectional view of the flat adhesive tape showing in FIG. 2A.

FIGS. 2A to 2B are schematic, cross-sectional views showing the flat adhesive tape of the first preferred embodiment of the present invention.

Referring to 2B, an adhesive tape 200 having a substrate 202, a releasing layer 206 and an adhesive layer 204 is provided. The adhesive tape 200 described hereafter denotes an unwinded adhesive tape. The substrate 202 is composed of, for example, paper, synthetic paper, clothes, nonwoven, plastic film, embossed plastic film, or materials with similar property, wherein the plastic film is composed of, for example, Polypropylene (PP), Polyethylene Terephthalate (PET), Polyethylene (PE), Polyethylene Naphthalate (PEN), Polyimide (PI), Polyvinylchloride (PVC) or the like. In the present invention, the preferred substrate 202 can also be a metal foil, for example, copper foil, aluminum foil, a copper foil with silver plating on a single side or both sides thereof, or tin, chromium, nickel or gold plated copper foil. Furthermore, the substrate 202 can be a composite film consisting of above mentioned metal foils and plastic films. An adhesive layer 204 is formed on one side of the substrate 202, and a releasing layer 206 is formed on the other side of the substrate 202. The adhesive tape roll 200 is then winded up to be a semifinished, cordless and multi-layered adhesive tape with a given length and diameter. The semifinished, cordless and multi-layered adhesive tape is then cut into several multi-layered adhesive tapes with adequate width. These multi-layered adhesive tapes are then compressed into a flat shape. The letters TD indicate a transverse direction, which is perpendicular to the symmetric plane in the flat adhesive tape 220 which is multi-layered (hereafter the flat adhesive tape denotes a multi-layered flat adhesive tape). The letters PD indicate a parallel direction, which is parallel to the symmetric plane in the flat adhesive tape 220. The symmetric flat adhesive tape 220 is formed by compressing and self-cohering the innermost surface of the adhesive layer on the symmetric plane 208, as shown in FIG. 2A.

Second Preferred Embodiment

Figure 3:
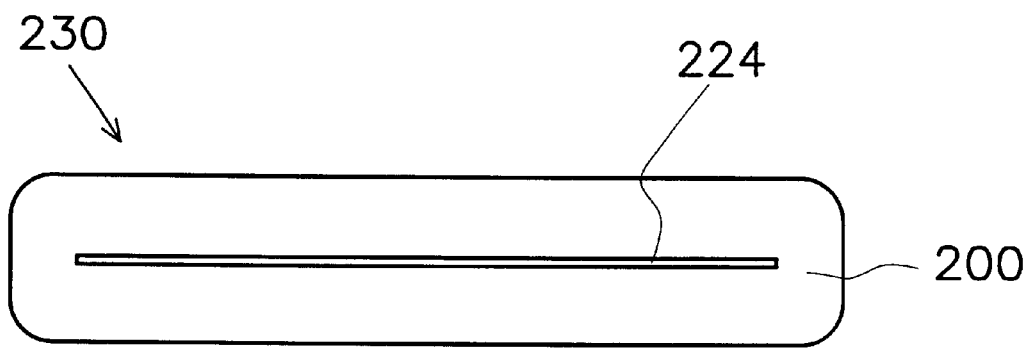
FIG. 3 is a schematic, cross-sectional view showing the flat adhesive tape having a high-adhesion layer in the plane of symmetry the flat adhesive tape shown in FIG. 2.

A high-adhesion layer 224 is further placed in the symmetric plane 208 of the flat adhesive tape 220 without paper cores, as described in the first embodiment. The preferred material of the high-adhesion layer 224 is a high glass transition temperature polymeric material, a thermoset material, a hot melt material, and a ultra-violet curable adhesive material. The preferential material of the high adhesion material is a cyanoacrylate adhesive or an epoxy adhesive. The flat adhesive tape 230 is then formed after the compressing and cohering steps are performed, as shown in FIG. 3. The "cyanoacrylate or epoxy adhesives on the symmetric plane can be easily cured and becomes a stiff interfacial layer 224. This stiff interfacial layer 224 partially eliminates the rebound force causing the deformation.

Third Preferred Embodiment

Figure 4:
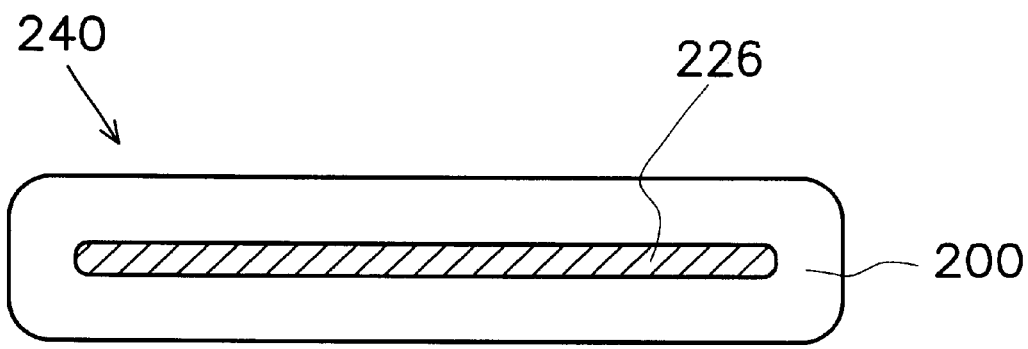
FIG. 4 is a schematic, cross-sectional view showing the flat adhesive tape having a stiff layer in the plane of symmetry plane of the flat adhesive tape shown in FIG. 2.

The stiff interfacial layer 226 may be placed in the symmetric plane of the flat adhesive tape 220 without a paper core, as described in the first embodiment, before the compressing step is performed. The preferred interfacial layer 226 has a length equal to or a little longer than the half-length of the innermost circumference of the adhesive tape without paper core. The length of the interfacial layer 226 can be longer than the half-length of the innermost circumference of the adhesive tape because of the existing of the adhesive layer's coherent and extended properties. The flat adhesive tape 220 is formed, as shown in FIG. 4, after the compressing step is performed. The stiff interfacial layer 226 is a flat and solid layer, and is composed of, for example, Polyethylene, Polypropylene, Polystyrene, Polyester, Polycarbonate, Polyvinyl Chloride (PVC), Acrylonitrile-Butadiene-Styrene (ABS), metal etc. The preferred material of the interfacial layer 226 is plastic or metal having high surface energy and polarity. Therefore, the partial rebound force caused by deformation is diminished by making the innermost surface of the cordless adhesive tape adhere to opposite surfaces of the stiff interfacial layer. Since it is not easy to separate the innermost surface of the adhesive tape from the surfaces of the interfacial layer, the flat shape of the adhesive tape is maintained.

Fourth Preferred Embodiment

Figure 5:
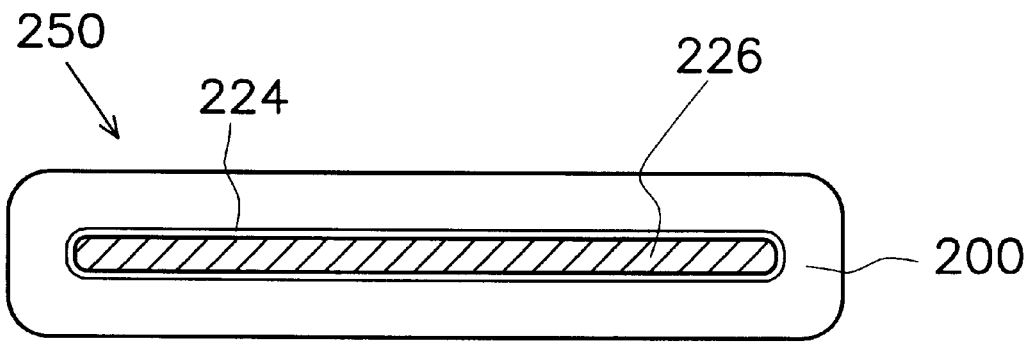
FIG. 5 is a schematic, cross-sectional view showing the flat adhesive tape having a high-adhesion layer and a stiff layer on the symmetry plane of the flat adhesive tape showing in FIG. 2.

The stiff interfacial layer 226 having a high adhesion property on its outer surface may be placed in the symmetric plane of the flat adhesive tape 220 without a paper core, as described in the third preferred embodiment, before the compressing step is performed. For example, a layer of high adhesion material layer 224 is coated on the outer surface of the stiff interfacial layer 226 followed by placing the stiff interfacial layer 226 in the symmetric plane of the adhesive layer 224. A flat adhesive tape 250 is then formed after a compressing step is performed on the adhesive layer, as shown in FIG. 5. The high adhesion material layer 224 is composed of material, for example, a high glass transition temperature polymeric material, a thermoset material, a hot melt material, and a ultra-violet curable adhesive material. The preferential material of the high adhesion material is a cyanoacrylate adhesive or an epoxy adhesive, having a high cross-linking density property after curing.

Fifth Preferred Embodiment

Figure 6:
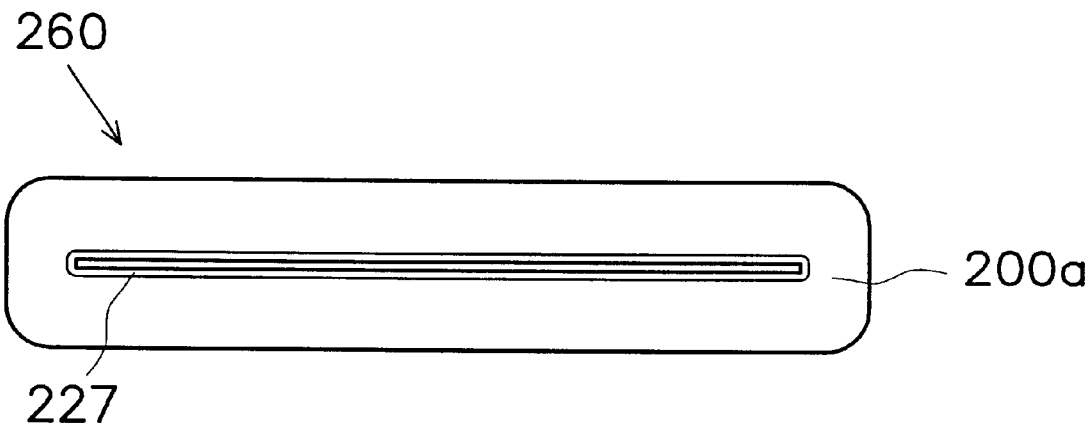
FIG. 6 is a schematic, cross-sectional view showing the flat adhesive tape having a paper or a plastic film, wherein there is a high-adhesion layer located in the plane of symmetry plane of the flat adhesive tape.

FIG. 6 is a schematic, cross-sectional view showing the flat adhesive tape according the fifth preferred embodiment of the present invention.

The adhesive structure in FIG. 6 is the same as FIG. 2B, so the description of the adhesive structure is omitted. The adhesive tape is multi-layer winded to a predetermined length and diameter, and a semi-finished product having one layer of material 227 on the innermost surface of the adhesive tape is obtained. The layer of material 227 can be a paper, synthetic paper, clothes, nonwoven, plastic, embossed plastic, metal etc. The semi-finished product is then cut into an adhesive tape 200a with a predetermined width. A layer of high-adhesion material or double-sided adhesive tape is then placed on between the surface of the paper layers or one plastic layers before the compressing step is performed on the semi-finished product. The preferred high-adhesion material is the adhesive material, selected from a high glass transition temperature polymeric material, a thermoset material, a hot melt material, and a ultra-violet curable adhesive material. The preferential material of the high adhesion material is a cyanoacrylate adhesive or an epoxy adhesive, having a high cross-linking density property after curing. The adhesive tape roll having a circular or non-circular shape is then compressed into flat adhesive tape 260 with flat piece shape.

Figure 7:
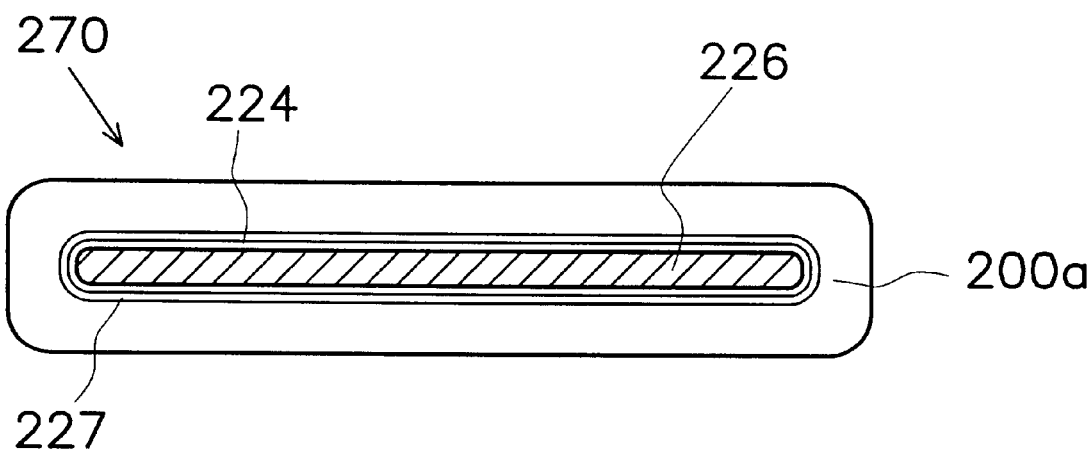
FIG. 7 is a schematic, cross-sectional view showing the flat adhesive tape having a high-adhesion layer and a stiff layer in the plane of symmetry of the flat adhesive tape shown in FIG. 6.
Figure 8A:
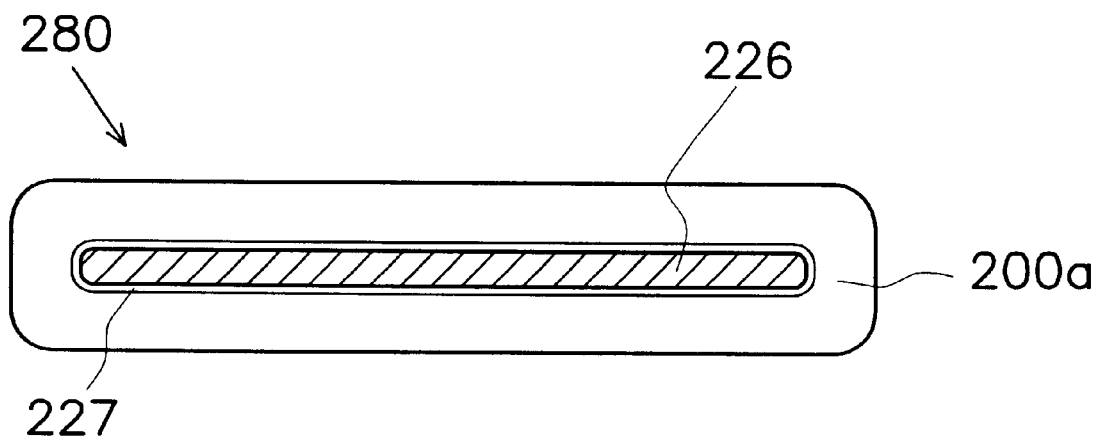
FIG. 8A is a schematic, cross-sectional view showing the flat adhesive tape having a stiff layer in the plane of symmetry of the flat adhesive tape shown in FIG. 6.

Furthermore, a layer of interfacial layer having high adhesion, for example, a stiff interfacial layer 226 coated by a layer of high adhesion material 224, can also be placed on the symmetric plane of adhesive tape 260 before the compressing step is performed. The flat adhesive tape 270, as shown in FIG. 7, is formed after the compressing step is performed. The interfacial layer 226 without coating with high adhesion material can be used instead of the interfacial layer coating with high adhesion material. The interfacial layer 226 can extend and flatten the adhesive tape along the plane of symmetry. This makes the adhesive tape roll become the flat adhesive tape 280, wherein the interfacial layer 226 has a length longer than or equal to the half-length of the innermost circumference of the adhesive tape roll, as shown in FIG. 8A.

Figure 8B:
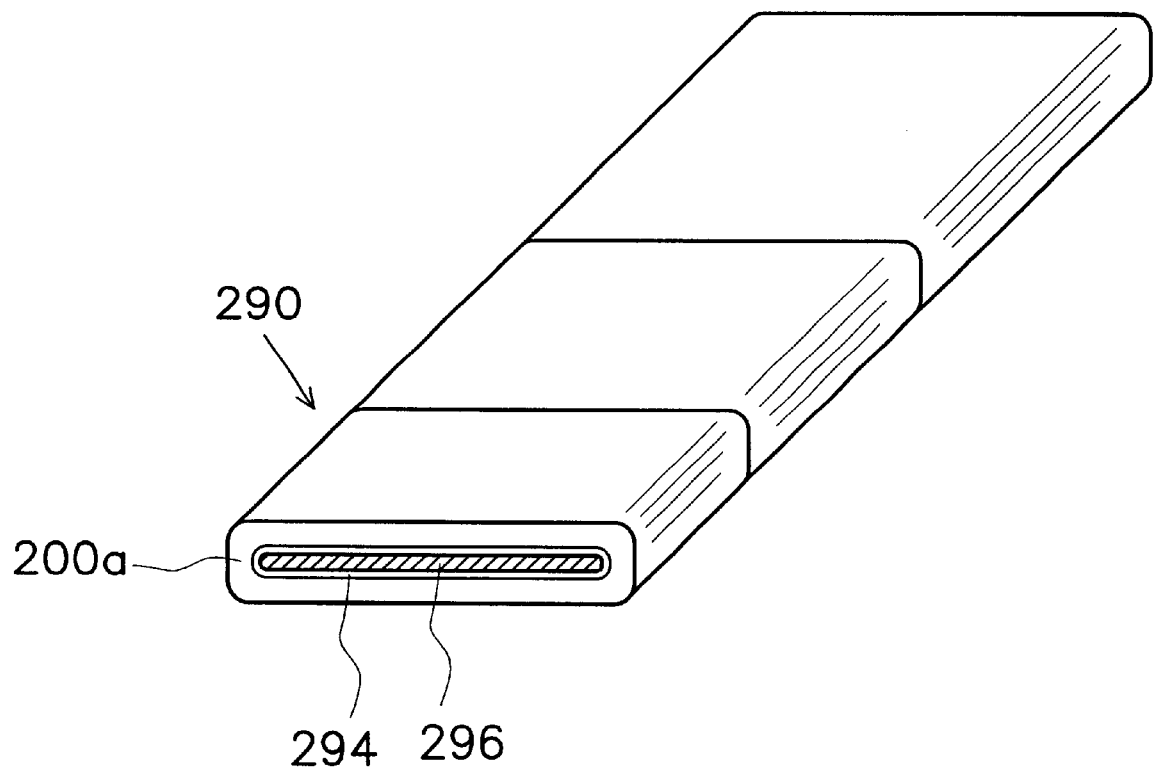
FIG. 8B is a schematic, side view showing the flat adhesive tapes roll with different width, wherein the flat adhesive tapes are arranged in a row.

Moreover, several adhesive tapes with different width could be arranged in a row before the adhesive tapes are compressed. A stiff interfacial layer 296 is applied to the central space, that is the plane of symmetry, within all the adhesive tapes, wherein the stiff interfacial layer 296 is, for example, coated with a layer of high adhesion material 294. The adhesive tapes are then compressed for forming the easily portable adhesive tapes 290, wherein the adhesive tapes 290 are arranged in a row, as shown in FIG. 8B.

Figure 9:
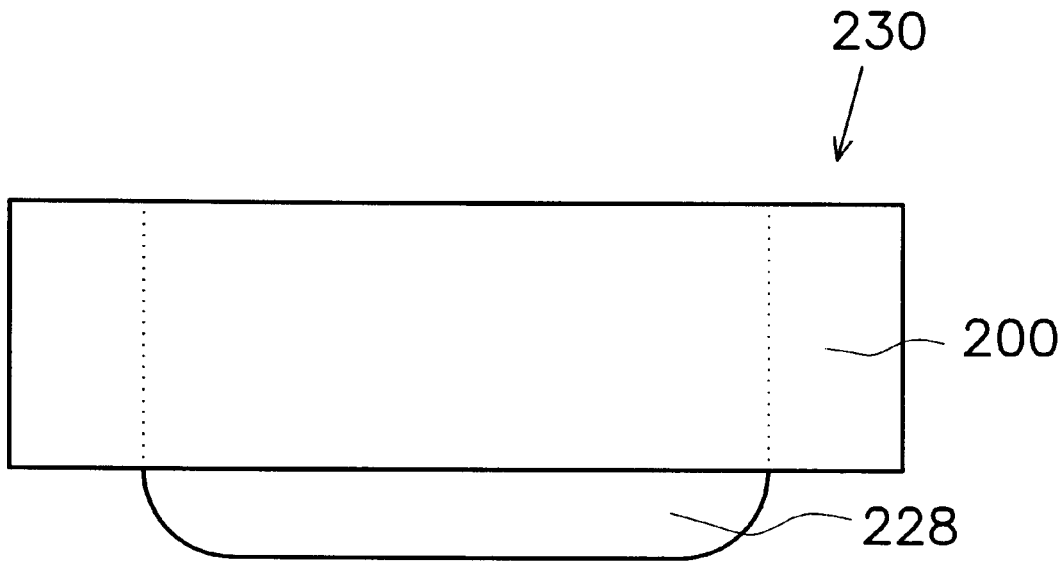
FIG. 9 is a schematic, top view showing the flat adhesive tape having a stiff layer in the plane of symmetry of the flat adhesive tape, wherein the stiff layer is wider than the adhesive tape.

Furthermore, a stiff interfacial layer 228 wider than the width of the adhesive tape roll can be utilized in the symmetry plane of the adhesive tape roll for adding the Trademark of the company or product on the flat adhesive tape, especial on the opaque adhesive tape roll. The Trademark of the company or product is marked on the extension portion of the stiff interfacial layer 228, which protrudes from the adhesive tape roll. If the stiff interfacial layer 228 is not coated with adhesive material, then the length of the stiff interfacial layer 228 should be longer than or equal to the half-length of the innermost circumference of the adhesive tape roll, as shown in FIG. 9. Of course, an adhesive layer (not shown) can be applied to the outside surface of the stiff interfacial layer 228 for diminishing partial rebound force, which caused the deformation of the flat adhesive tape 230.

Figure 10:
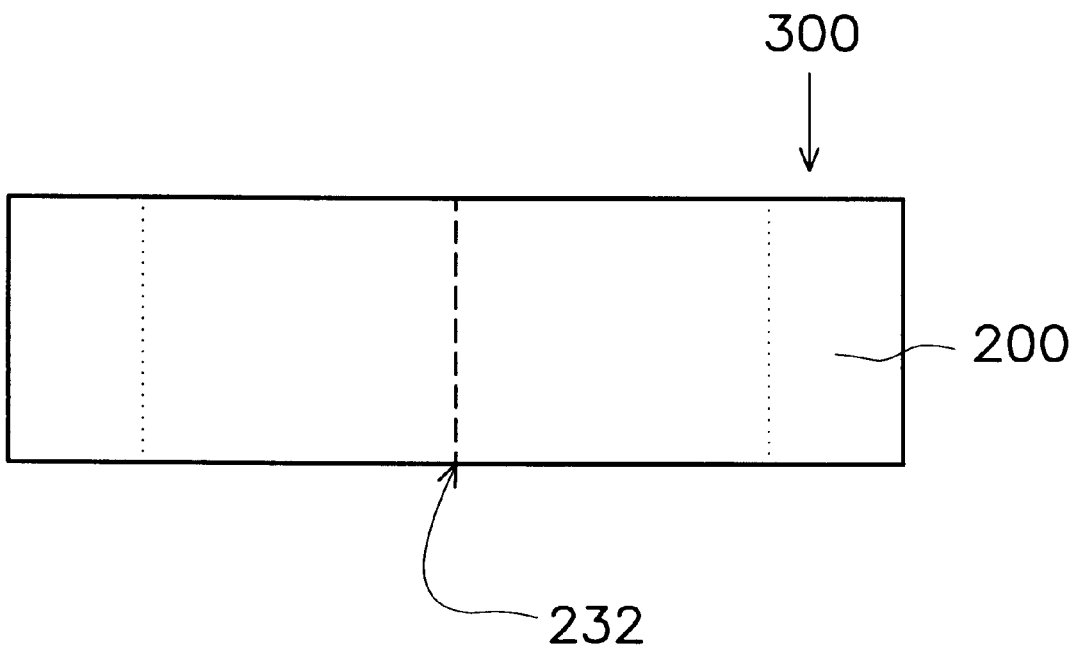
FIG. 10 is a schematic, top view showing the flat adhesive tape having perforations holes.
Figure 11:
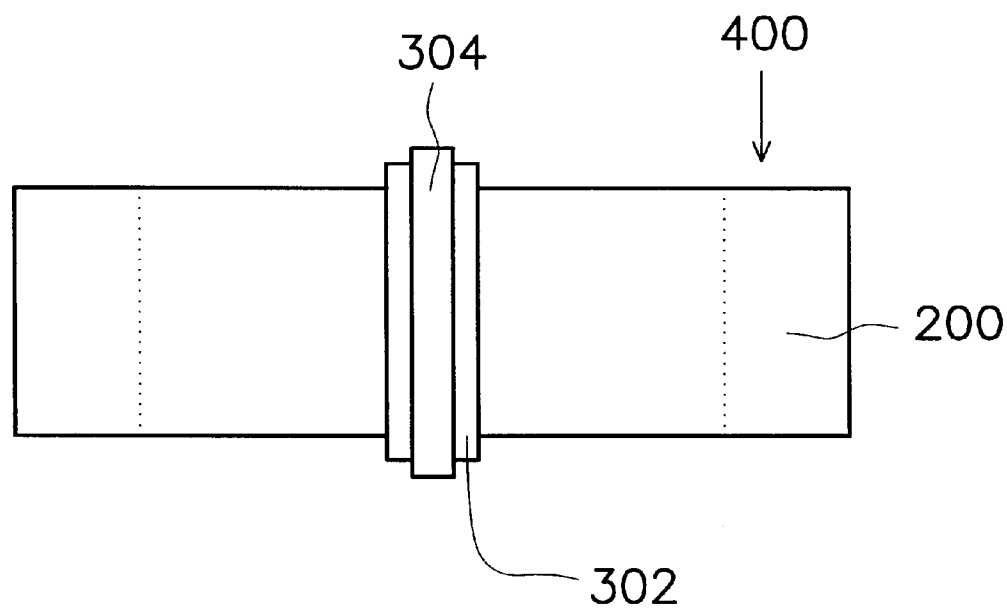
FIG. 11 is a schematic, top view showing the flat adhesive tape having a binder and a safe cutter.
Figure 12:
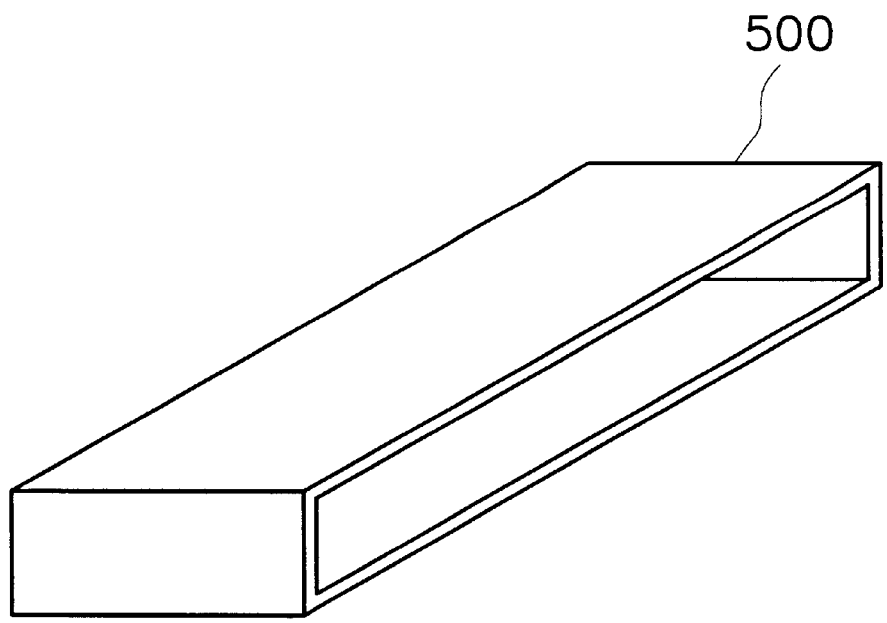
FIG. 12 is a schematic, side view showing the container for storing the flat adhesive tape.

For easy use, perforations 232 can be drilled along the width, the first to fifth preferred embodiments. This makes the flat adhesive tape become a flat adhesive tape 300 with easy tearing off property, as shown in FIG. 10. A binder 302 with a safe cutter 304 can be used, instead of the perforations, on the adhesive tapes 400 for easy removal, as shown in FIG. 11. Furthermore, the flat adhesive tape as described can be placed into a flat, rectangular container 500, as shown in FIG. 12.

If the flat adhesive tape is a transparent adhesive tape, then the Trademark of the company or the product can be applied to the surface of the interfacial layer 226. Furthermore, if the adhesive tape roll has the stiff interfacial layer, for example, a polyester or metal foil layer, no deformation of the adhesive tape will occur even when the flat adhesive tape is almost used up. Therefore, the flat adhesive tape can still be easily used.

Furthermore, the adhesive surface of the adhesive tape roll can be placed inwardly or outwardly, and is not limited to the embodiments. If the adhesive surface of the adhesive tape is outwardly placed, then the flat adhesive tape can be used to remove lint and dust from clothes or a carpet. The flat adhesive tape also has other benefits; for example, it is easy to find the starting point of the flat adhesive tape due to the adhesion.

Other embodiments of the invention will appear to those skilled in the art from consideration of the specification and practice of the invention disclosed herein. It is intended that the specification and examples be considered as exemplary only, with the true scope and spirit of the invention being indicated by the following claims.

What is claimed is:

1. A process for manufacturing a flat adhesive tape, comprising the steps of:

providing a flat stiff interfacial layer having a symmetric plane;

deposing a high adhesion material on the interfacial layer, wherein the high adhesion material is one selected from a group consisting of high glass transition temperature polymeric material, thermoset material, hot melt material, and ultra-violet adhesive material; and surrounding the symmetric plane of the stiff interfacial layer and the high adhesive material thereon with an adhesive layer in a multi-layer manner to form a roll of adhesive tape; and flattening the roll of the adhesive tape.

2. The process for manufacturing a flat adhesive tape according to claim 1, further comprising a step of providing a film between the adhesive layer and the layer of high adhesion material.

3. The process for manufacturing a flat adhesive tape according to claim 1, further comprising a step of forming a plurality of perforation holes on the adhesive tape, wherein the perforation holes located along a width of the adhesive tape so that segments of the adhesive tape can be easily removed.

4. The process for manufacturing a flat adhesive tape according to claim 1, further comprising a step of providing a binder having a safe cutter for further fixing and binding the adhesive tape and so that segments of the adhesive tape can be easily removed.

5. The process for manufacturing a flat adhesive tape according to claim 1, further comprising a step of providing a container with a rectangular and flat form for storing the adhesive tape.

6. The process for manufacturing a flat adhesive tape according to claim 1, wherein the adhesive layer is transparent and the stiff interfacial layer has a mark located thereon.

7. The process for manufacturing a flat adhesive tape according to claim 1, wherein the width of the adhesive layer is substantially equal to that of the stiff interfacial layer.

8. The process for manufacturing a flat adhesive tape according to claim 7, wherein the adhesive layer has a transparent property and the stiff interfacial layer has a mark located thereon.

9. The process for manufacturing a flat adhesive tape according to claim 7, wherein the adhesive layer has an adhesive surge located facing the stiff interfacial layer.

10. The process for manufacturing a flat adhesive tape according to claim 9, further comprising a step of providing a layer of material between the adhesive layer and the stiff interfacial layer.

11. The process for manufacturing a flat adhesive tape according to claim 10, wherein the layer of material is selected from the group consisting of paper, synthetic paper, clothes, nonwoven, plastic, embossed plastic, and metal.

12. The process for manufacturing a flat adhesive tape according to claim 7, wherein the adhesive layer has an adhesive surface located apart from the stiff interfacial layer.

13. The process for manufacturing a flat adhesive tape according to claim 1, wherein the width of the adhesive layer is smaller than that of the stiff interfacial layer so that a portion of the stiff interfacial layer extends out from the adhesive layer, wherein the extended portion of the stiff interfacial layer is adapted for marking.

14. The process for manufacturing a flat adhesive tape according to claim 13, wherein the adhesive layer has an adhesive surface facing the stiff interfacial layer.

15. The process for manufacturing a flat adhesive tape according to claim 14, further comprising a step of providing a layer of material between the adhesive layer and the stiff adhesive layer.

16. The process for manufacturing a flat adhesive tape according to claim 15, wherein the layer of material is selected from the group consisting of paper, synthetic paper, clothes, nonwoven, plastic, embossed plastic, and metal.

17. The process for manufacturing a flat adhesive tape according to claim 13, further comprising a step of disposing an adhesive surface apart from the stiff interfacial layer.

18. A process for manufacturing a flat adhesive tape, comprising the steps of:

providing a plurality of multi-layered adhesive tape rolls;

arranged the multi-layered adhesive tape rolls in a row;

providing a stiff interfacial layer which has a layer of high adhesion material thereon, wherein the high adhesion material is one selected from a group consisting of high glass transition temperature polymeric material, thermoset material, hot melt material, and ultra-violet adhesive material;

inserting the stiff interfacial layer having the high adhesion material thereon into a central space within each of the multi-layered adhesive tape rolls; and compressing the multi-layered adhesive tape rolls.

* * * * *